United States Patent [19]
Sugata et al.

[11] Patent Number: 5,336,321
[45] Date of Patent: Aug. 9, 1994

[54] PAINT APPARATUS HAVING TWO ROBOTS

[75] Inventors: Akihiko Sugata, Okazaki; Kenji Tamura, Nagoya; Yoshiyuki Mabuchi, Toyota, all of Japan

[73] Assignee: Toyota Jidosha Kabushiki Kaisha, Toyota, Japan

[21] Appl. No.: 9,918

[22] Filed: Jan. 27, 1993

[30] Foreign Application Priority Data

Jan. 27, 1992 [JP] Japan .................................. 4-33919

[51] Int. Cl.⁵ .............................................. B05D 1/02
[52] U.S. Cl. .................................. 118/315; 118/323; 118/326; 901/43
[58] Field of Search .................. 118/315, 323, 326; 901/41, 43

[56] References Cited
FOREIGN PATENT DOCUMENTS

| | | |
|---|---|---|
| 084523 | 7/1983 | European Pat. Off. . |
| 122034 | 10/1984 | European Pat. Off. . |
| 192338 | 8/1986 | European Pat. Off. . |
| 57-207572 | 12/1982 | Japan . |
| 59-6705 | 2/1984 | Japan . |
| 61-114774 | 6/1986 | Japan . |
| 156833 | 12/1989 | Japan . |
| 228747 | 2/1990 | Japan . |
| 245168 | 3/1990 | Japan . |
| 2180173 | 3/1987 | United Kingdom . |
| 2246963 | 2/1992 | United Kingdom . |

*Primary Examiner*—Matthew O. Savage
*Attorney, Agent, or Firm*—Cushman, Darby & Cushman

[57] ABSTRACT

A paint apparatus includes a framework having a beam, a carriage constrained to move reciprocally along the beam, a first robot mounted to the carriage and movable relative to the carriage except in a direction parallel to the beam, and a second robot mounted to the carriage and movable relative to the carriage except in the direction parallel to the beam. The first and second robots and are spaced from each other in the direction parallel to the beam and in a direction perpendicular to the beam. As a result, interference between the first and second robots and is prevented and paint sprayed onto each other is prevented.

9 Claims, 12 Drawing Sheets

PAINT APPARATUS HAVING TWO ROBOTS

BACKGROUND OF THE INVENTION

1. Field of the Invention

The present invention relates to a paint apparatus for automatically painting a workpiece conveyed into a painting booth by a conveyor using two painting robots which are prevented from interfering with each other.

2. Description of the Prior Art

Painting automobile bumpers is an automated process in which the bumpers are usually painted using painting robots. A painting line is provided with a plurality of painting robots to increase production efficiency.

FIG. 12 illustrates one example of a conventional automobile bumper painting line. A conveyor 2 extends through a painting booth 1 and automobile bumpers 3 are conveyed into the painting booth 1 at regular intervals. The bumpers 3 are stopped at four predetermined painting positions to be painted. Painting robots 4 are arranged adjacent to respective painting positions. The respective painting robots 4 paint the respective, hatched portions of the bumpers 3.

FIG. 13 illustrates another example of a conventional bumper painting line which is shortened as compared with the painting line of FIG. 12. In the painting line of FIG. 13, a conveyor 12 extends through a painting booth 11 where two predetermined painting positions are provided. End portions of a bumper 13 are painted at a first painting position using two first painting robots and the remaining portion of the bumper 13 is painted at a second painting position using two second painting robots. By arranging the two first robots and the two second robots in an opposing relationship with each other, the length of the painting booth 11 is shortened.

However, in this opposing arrangement of the painting robots, the following problems result:

First, because painting programs of the opposing robots are executed independently of each other, there is an overlapping zone in the working areas of the opposing robots. As a result, the opposing robots may collide with each other in the overlapping zone as shown in FIG. 14. To prevent such a collision requires complicated and difficult programming.

Second, the opposing robots spray large amounts of paint onto each other. When the sprayed paint falls from the robots onto a bumper positioned under the robots, the paint quality of the bumper is deteriorated.

SUMMARY OF THE INVENTION

An object of the invention is to provide a paint apparatus with two painting robots wherein collision and spray between the two robots are prevented.

The above-described object is achieved by a paint apparatus in accordance with the present invention, which is installed in a painting booth having a longitudinal direction. A workpiece is conveyed in the longitudinal direction into the painting booth, stopped at a predetermined painting position, painted by the paint apparatus, and taken out of the painting booth. The paint apparatus includes: a framework including two vertical posts and a horizontal beam extending between the two posts; a carriage constrained to move along the beam of the framework; a first robot mounted to the carriage; and a second robot mounted to the carraiage. The beam is located above the workpiece being painted and spaced away from the predetermined painting position in a horizontal direction. The first robot can move relative to the carriage except in a first direction parallel to the direction in which the beam extends. The second robot mounted to the carriage is offset from the first robot both in the first direction and in a second direction horizontal and perpendicular to the first direction. The second robot can move relative to the carriage except in the first direction.

In the above-described paint apparatus, a workpiece is conveyed into the painting booth and is stopped at the painting position, where the workpiece is painted by the first and second robots. Since the first and second robots are coupled to the carriage so as to be spaced from each other in the first and second directions and are driven together with the carriage in the first direction maintaining the distance between them, the first and second robots do not interfere with each other in movement.

Furthermore, since the first and second robots are spaced apart from each other in the first direction, they do not spray a large amount of paint onto each other. As a result, there is less chance that paint will adhere to the robots and then fall from the robots onto the workpiece to deteriorate the painting quality. Furthermore, since the beam of the framework is spaced away from the painting position in the horizontal direction, there is also less chance that the paint adhering to the beam will fall from the beam onto the workpiece to deteriorate the painting quality.

BRIEF DESCRIPTION OF THE DRAWINGS

The above-described object and other objects, features, and advantages of the present invention will become more apparent and readily appreciated from the following detailed description of the preferred embodiments of the invention taken in conjunction with the accompanying drawings, in which.

PREFERRED EMBODIMENTS OF THE PREFERRED EMBODIMENTS

Figure 2:
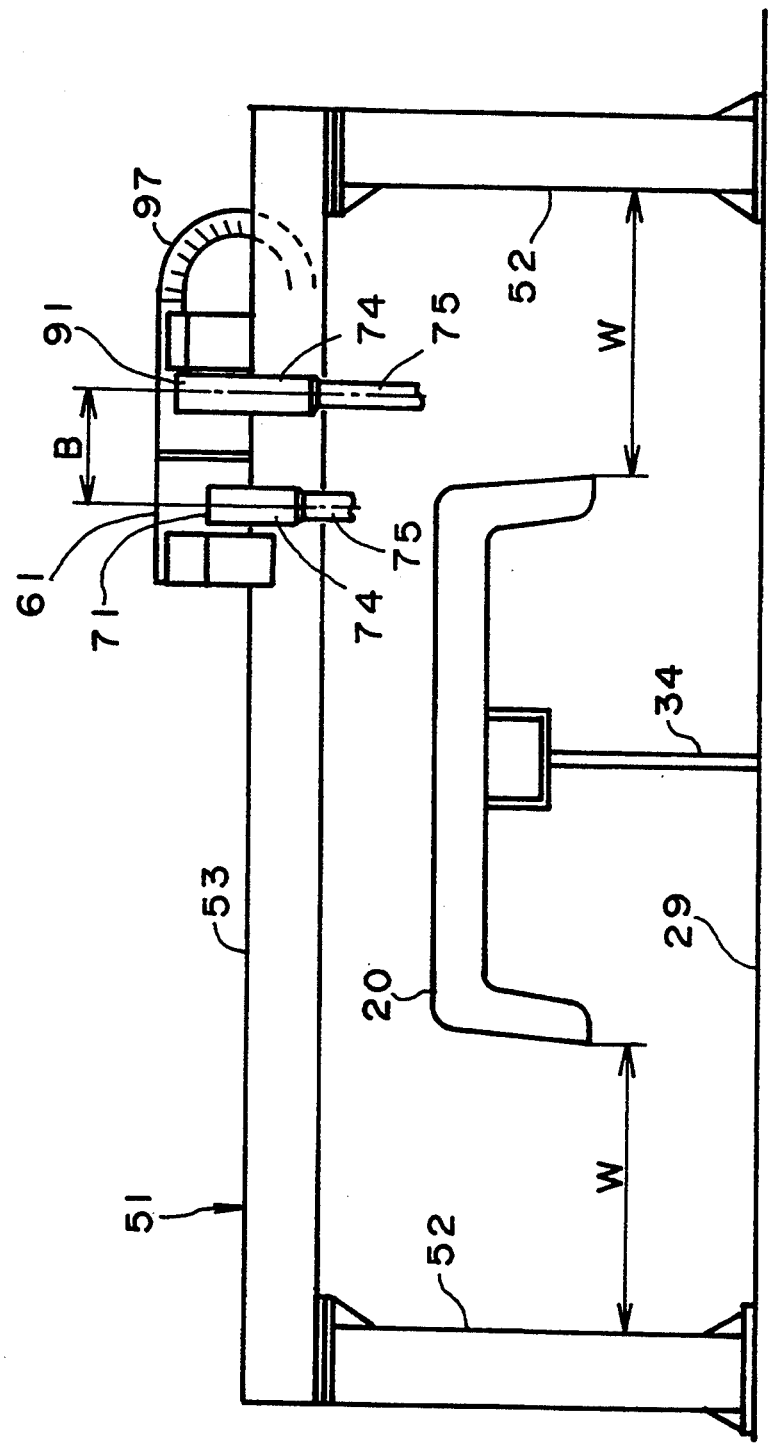
FIG. 2 is a front elevational view of the paint apparatus of FIG. 1.
Figure 3:
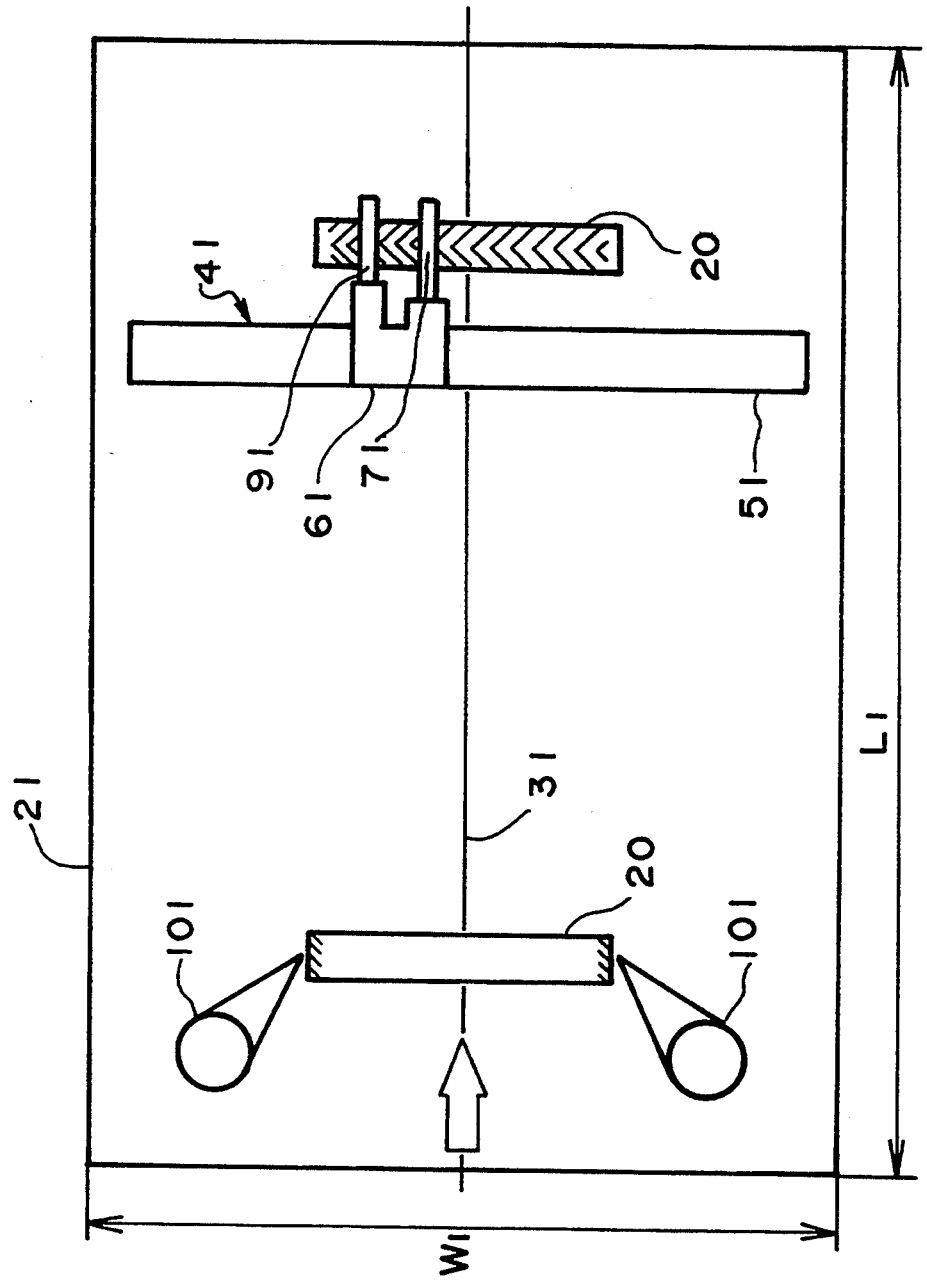
FIG. 3 is a plan view of a painting booth in which the paint apparatus of FIG. 1 is installed.
Figure 4:
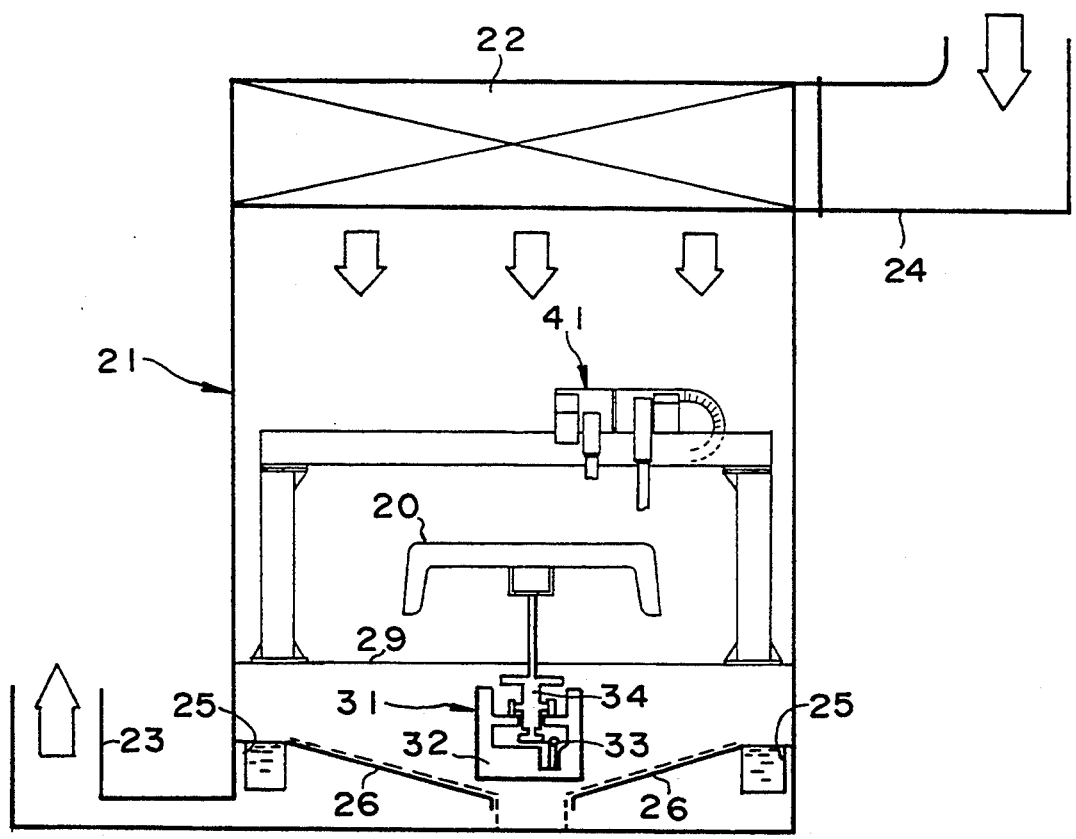
FIG. 4 is a cross-sectional view of the painting booth of FIG. 3.

FIGS. 1 through 10 illustrate a paint apparatus in accordance with the first embodiment of the invention. As illustrated in FIG. 4, an air filter 22 is provided at the top of a painting booth 21, and an exhaust duct 23 is provided at the bottom of the painting booth 21. Air introduced through an intake duct 24 is filtered by the air filter 22 and is fed into the painting booth 21, and the air is exhausted outside through the exhaust duct 23.

Water tanks 25 are provided at opposite sides of a lower portion of the painting booth 21. Water overflowing from the tanks 25 flows along inclining plates 26 toward a centeral portion of the painting booth 21 and falls from the ends of the plates to form water curtains. When the air including paint mist passes through the water curtains, the mist is captured by the water curtains.

The floor 29 of the painting booth allows air to pass therethrough and is constructed of, for example, a wire-netting or a perforated plate. A conveyor 31 is provided under the floor 29. The conveyor 31 includes a rail unit 32, a drive chain 33, and a carrier 34. The carrier 34 is supported by the rail unit 32 so as to be movable. The chain 33 has a hook (not shown) for engaging the carrier 34.

The carrier 34 carries a workpiece, such as an automobile bumper 20, to be painted. The carrier 34 is driven by the drive chain 33. When the workpiece reaches a predetermined painting position in the painting booth, the hook disengages the carrier so that the carrier stops at the painting position.

Figure 12:
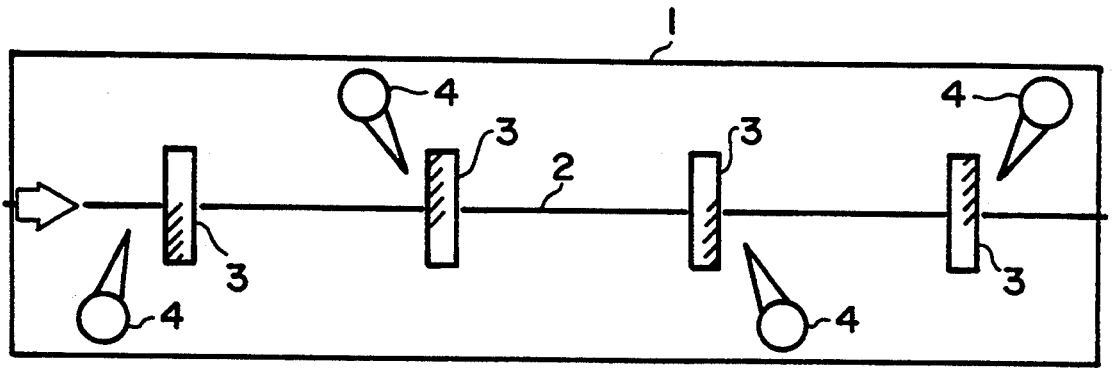
FIG. 12 is a plan view of a conventional painting booth for painting automobile bumpers.
Figure 13:
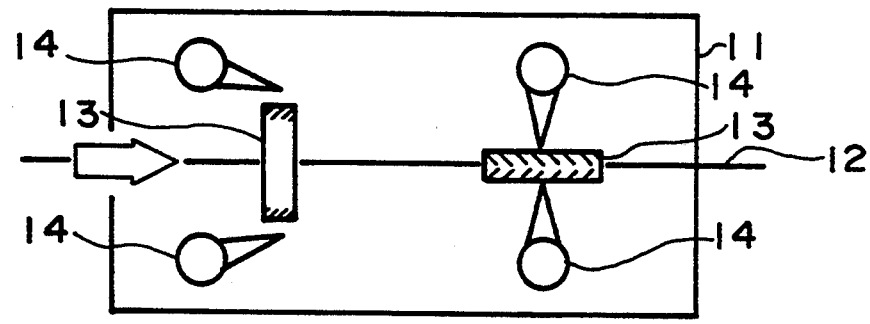
FIG. 13 is a plan view of another conventional painting booth for painting automobile bumpers.
Figure 14:
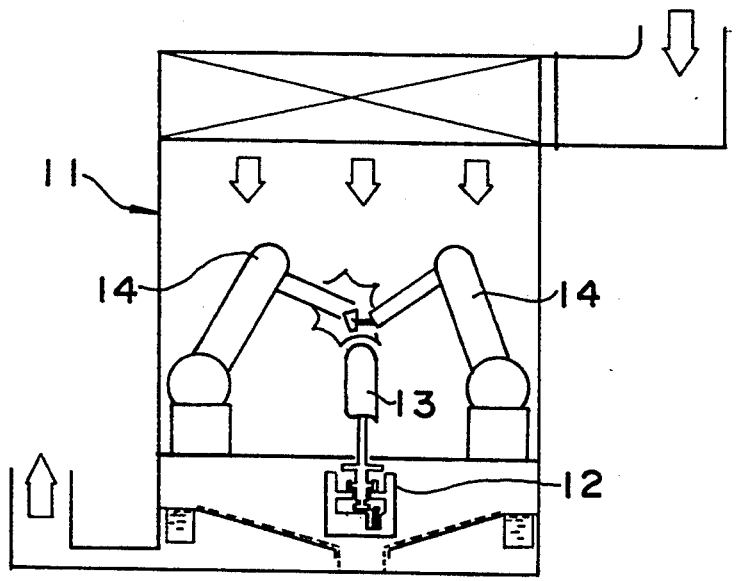
FIG. 14 is a cross-sectional view of the painting booth of FIG. 13 showing the painting robots colliding with each other.

As illustrated in FIG. 3, in the painting booth 21 there are two painting positions, a first painting position where end portions of the bumper 20 are painted and a second painting position where the remaining portions of the bumper 20 are painted. The painting apparatus of the present invention is located adjacent to the second painting position. The painting booth has a length $L_1$ and width $W_1$. The length $L_1$ is less than that of conventional painting booths, as shown in FIG. 12.

Two painting robots 101 for painting the end portions of the bumper 20 are located in the vicinity of the opposite end portions of the bumper 20 in the first painting position so as to oppose each other, and so that they do not interfere with each other when moving.

The painting apparatus 41 of the invention is arranged in the vicinity of the second painting position. The paint apparatus 41 includes a framework 51, a carriage 61, a first robot 71, and a second robot 91.

Figure 1:
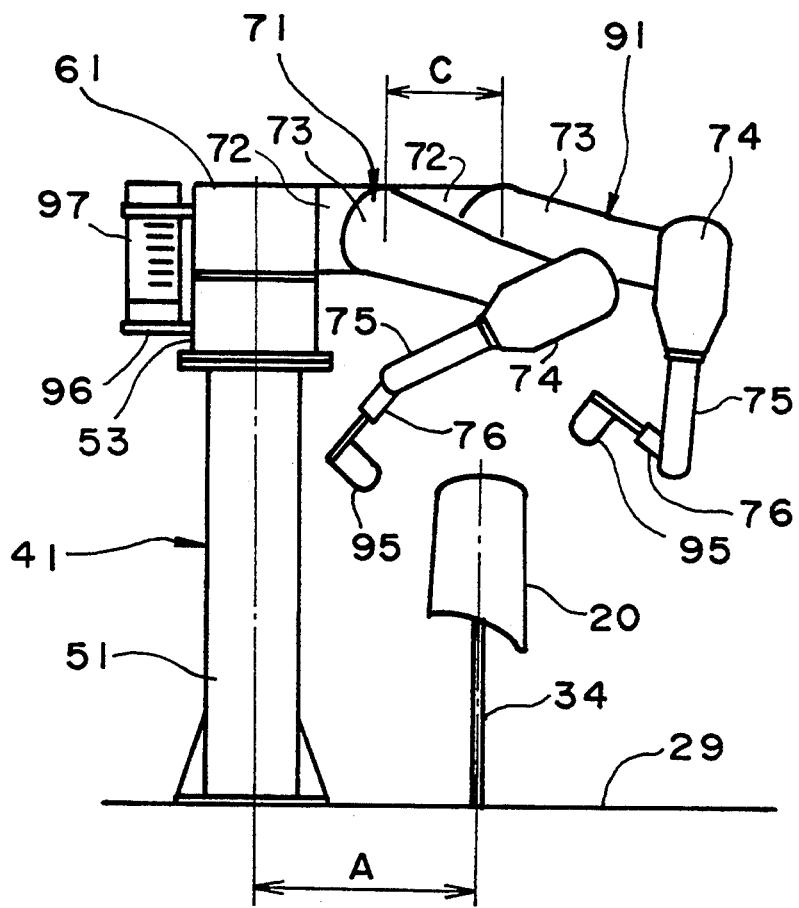
FIG. 1 is a side elevational view of a paint apparatus in accordance with a first embodiment of the invention.

Referring to FIGS. 1 and 2, the framework 51 includes two vertical posts 52 fixed to the floor 29 of the painting booth and a horizontal beam 53 extending between top portions of the two posts 52. The workpiece 20 is conveyed under the beam 53. The beam 53 is spaced by distance A in a horizontal direction from the predetermined painting position. The distance A is, for example, 1,000 mm.

Referring to FIGS. 1, 2, 5, and 6, the carriage 61 is constrained to move reciprocally along the beam 53. The carriage 61 includes a body 62, a drive motor 63, which is an electric reversible and reduction-geared motor, a guide 65, and a pinion 66 driven by the drive motor 63. A rail 64 extending in the longitudinal direction of the beam 53 is fixed to the beam 53 of the framework 51, and the guide 65 slidably engages the rail 64. A rack 67 extending in the longitudinal direction of the beam 53 is fixed to the beam 53 of the framework and the pinion 66 engages the rack 67.

A first robot 71 and a second robot 91 are supported by the body 62 of the carriage 61. Each of the first and second robots 71 and 91 has at least five degrees of freedom of movement relative to the carriage 61 except in a direction parallel to the beam 53. The first robot 71 and the second robot 91 are spaced apart from each other by predetermined distance B (for example, 500 mm) in a first direction in which the beam 53 extends, so that the first robot 71 and the second robot 91 do not collide with each other. When the carriage 61 is driven along the beam 53, the first and second robots 71 and 91 move in the direction along the beam 53 together with the carriage 61, thus maintaining a constant distance B between the first and second robots.

The first robot 71 is directly coupled to the carriage 61. The second robot 91 is coupled to the carriage 61 via a spacer 90 so that the first and second robots are spaced from each other by predetermined distance C (for example, 500 mm) in a second direction horizontal and perpendicular to the first direction. First and second spray guns 95 for injecting paint onto the workpiece are held by wrist flanges of the first and second robots, respectively. Since the first and second robots 71 and 91 are spaced from each other in the second direction by means of the spacer 90, the first spray gun is located on one side of the workpiece and the second spray gun is located on another side of the workpiece while the workpiece is painted.

The first robot 71 and the second robot 91 have the same structure and the same manipulating function. Each of the first and second robots 71 and 91 includes a base 72, a first arm 73, a second arm 74, a third arm 75, a wrist member 76, and a wrist flange 76a.

Figure 5:
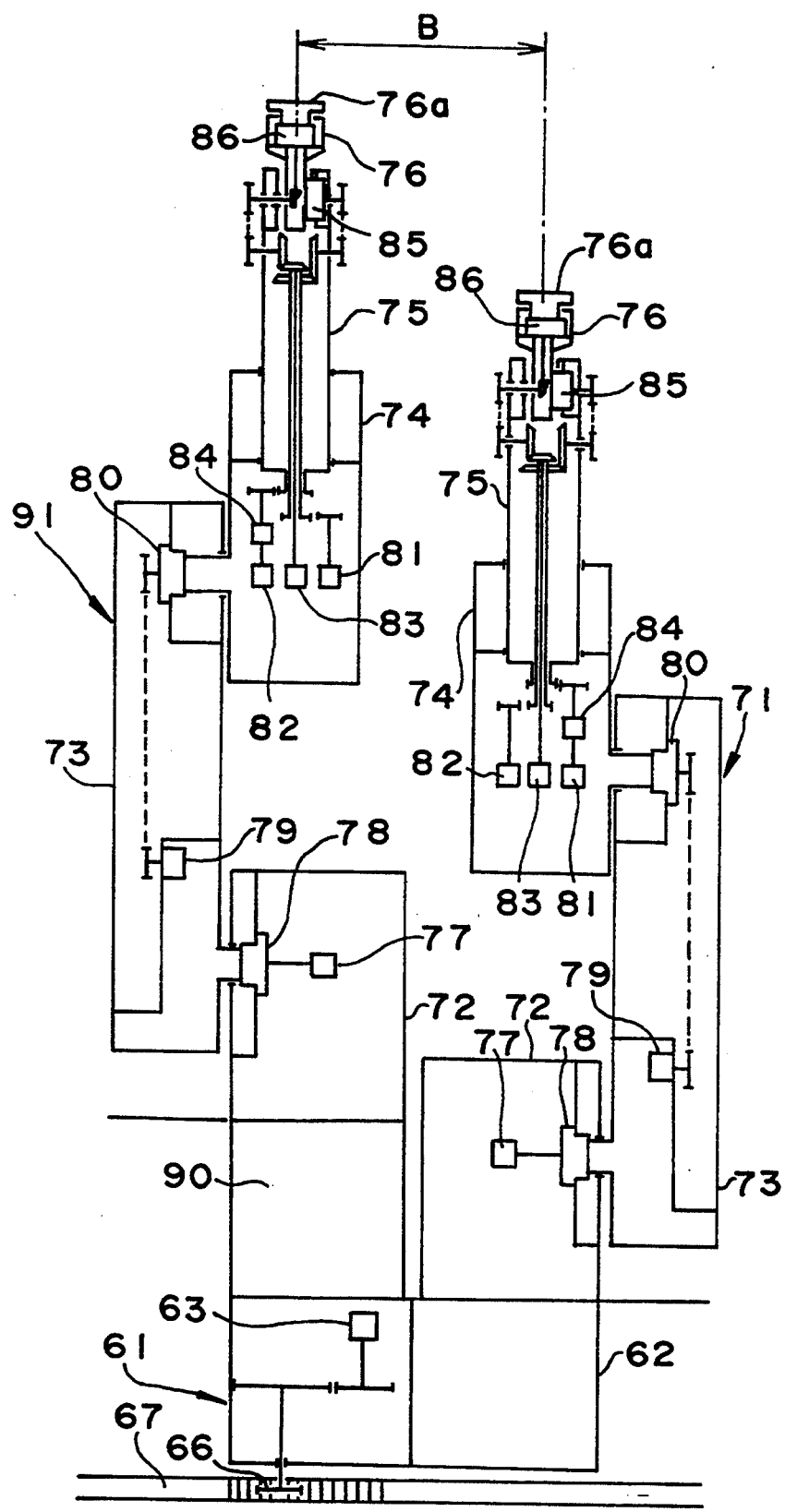
FIG. 5 is a schematic cross-sectional view of a first robot and a second robot included in the paint apparatus of FIG. 1.
Figure 6:
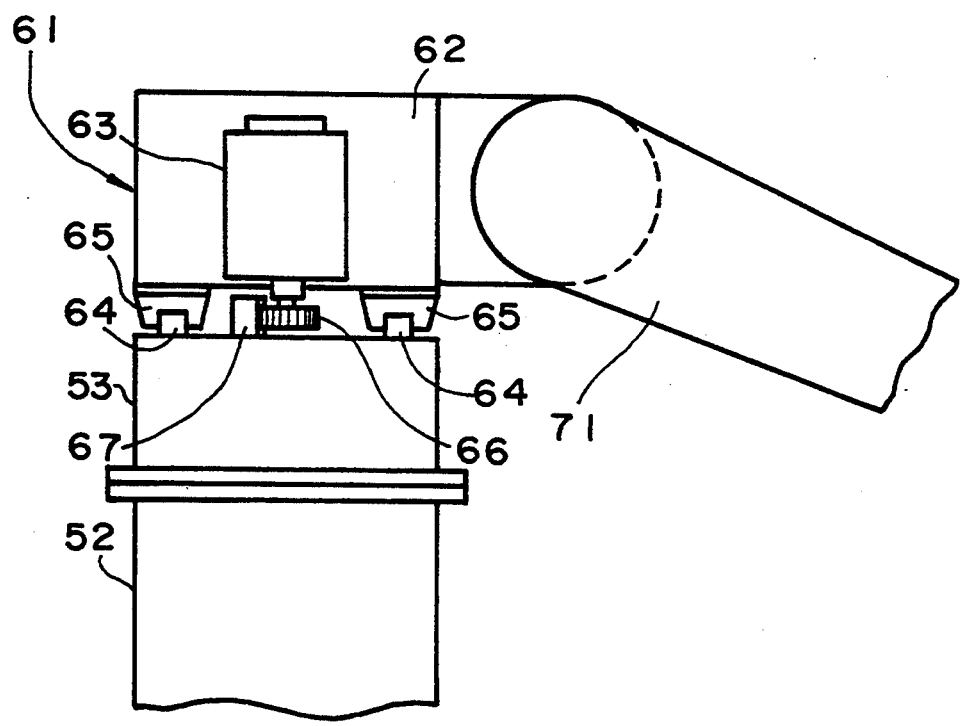
FIG. 6 is a side view of a carriage and members located in the vicinity of the carriage of the paint apparatus of FIG. 1.

Referring to FIGS. 1 and 5, the base 72 is coupled to the carriage 61 and defines a first axis which extends in the first direction parallel to the beam 53 of the framework. The first arm 73 is coupled to the base 72 so as to be rotatable about the first axis and extends perpendicularly to the first axis. The first arm 73 defines a second axis which is parallel to and is spaced from the first axis. The second arm 74 is coupled to the first arm 73 so as to be rotatable about the second axis and extends perpendicularly to the second axis. The second arm 74 defines a third axis which is perpendicular to and intersects the second axis. The third arm 75 is coupled to the second arm 74 so as to be rotatable about the third axis and extends along the third axis. The third arm 75 defines a fourth axis which is perpendicular to and intersects the third axis. The wrist member 76 is coupled to the third arm 75 so as to be rotatable about the fourth axis and extends perpendicularly to the fourth axis. The wrist member 76 defines a fifth axis which is perpendicular to and intersects the fourth axis. The wrist flange 76a is coupled to the wrist member 76 so as to be rotatable about the fifth axis and extends along the fifth axis. The spray gun 95 is coupled to the wrist flange 76a.

The base 72 is hollow, and a first electric motor 77 for rotating the first arm 73 and a first speed reducer 78 coupled to an output shaft of the motor 77 are housed within the base 72. The first arm 73 is hollow, and a second electric motor 79 for rotating the second arm 74 and a second speed reducer 80 which is driven by the motor 79 via a chain are housed within the first arm 73.

The second arm 74 is hollow. A third electric motor 82 for rotating the third arm 75 and a third speed reducer 84 coupled to an output shaft of the third motor 81 are housed within the second arm 74. A fourth electric motor 82 for rotating the wrist member 76 and a fourth speed reducer 85 coupled to an output shaft of the fourth motor 82 via gears also are housed within the second arm 74. A fifth electric motor 83 for rotating the wrist flange 76a is also housed within the second arm 74. A fifth speed reducer 86 is connected to an output shaft of the fifth motor 83 via gears.

The distance B between the first robot 71 and the second robot 91 in the first direction is greater than twice the distance between the fourth axis and a tip end of the wrist flange 76a so that the first robot 71 and the second robot 91 do not interfere with each other in movement.

Referring to FIGS. 1 and 3, air hoses and paint hoses connected the spray guns 95 to an air source and a paint source which are located outside the painting booth 21. The hoses form a flexible cable 97 supported by a cable support 96 which is fixed to the framework 51.

Operation of the paint apparatus of the first embodiment of the invention will now be explained with reference to FIGS. 3, 4, 7, 8, and 9.

A workpiece 20 is conveyed into the painting booth 21 by the conveyor 31. When the workpiece 20 reaches the predetermined painting position, the hook of the chain 33 disengages the workpiece and the workpiece 20 stops at the predetermined painting position.

Then, the two painting robots 101 located at the first predetermined position begin to paint the end portions of the workpiece as shown in FIG. 3. Since the two robots 101 paint the end portions of the workpiece only, the two robots 101 do not interfere with each other when moving.

Figure 7:
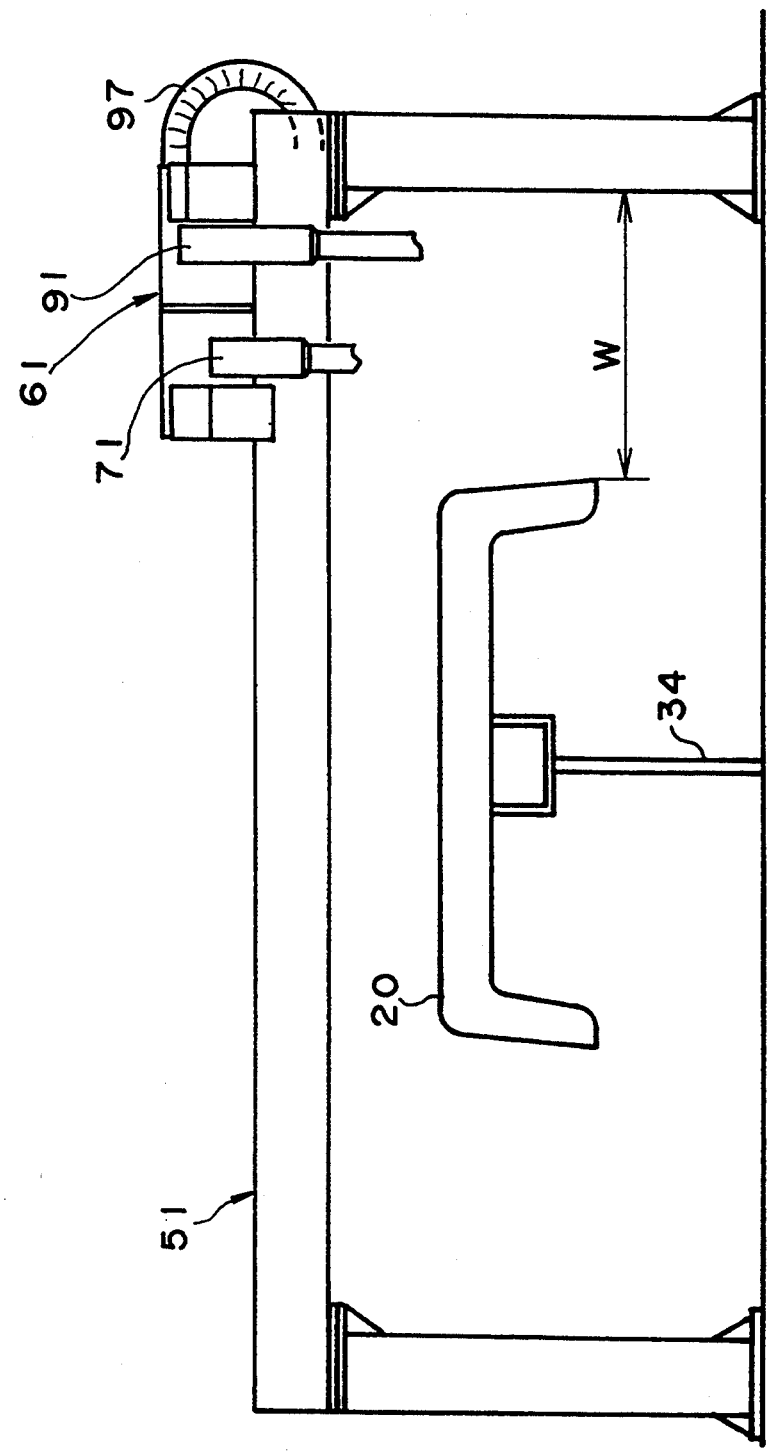
FIG. 7 is a front elevational view of the paint apparatus of FIG. 1 showing the robots in a waiting position.
Figure 9:
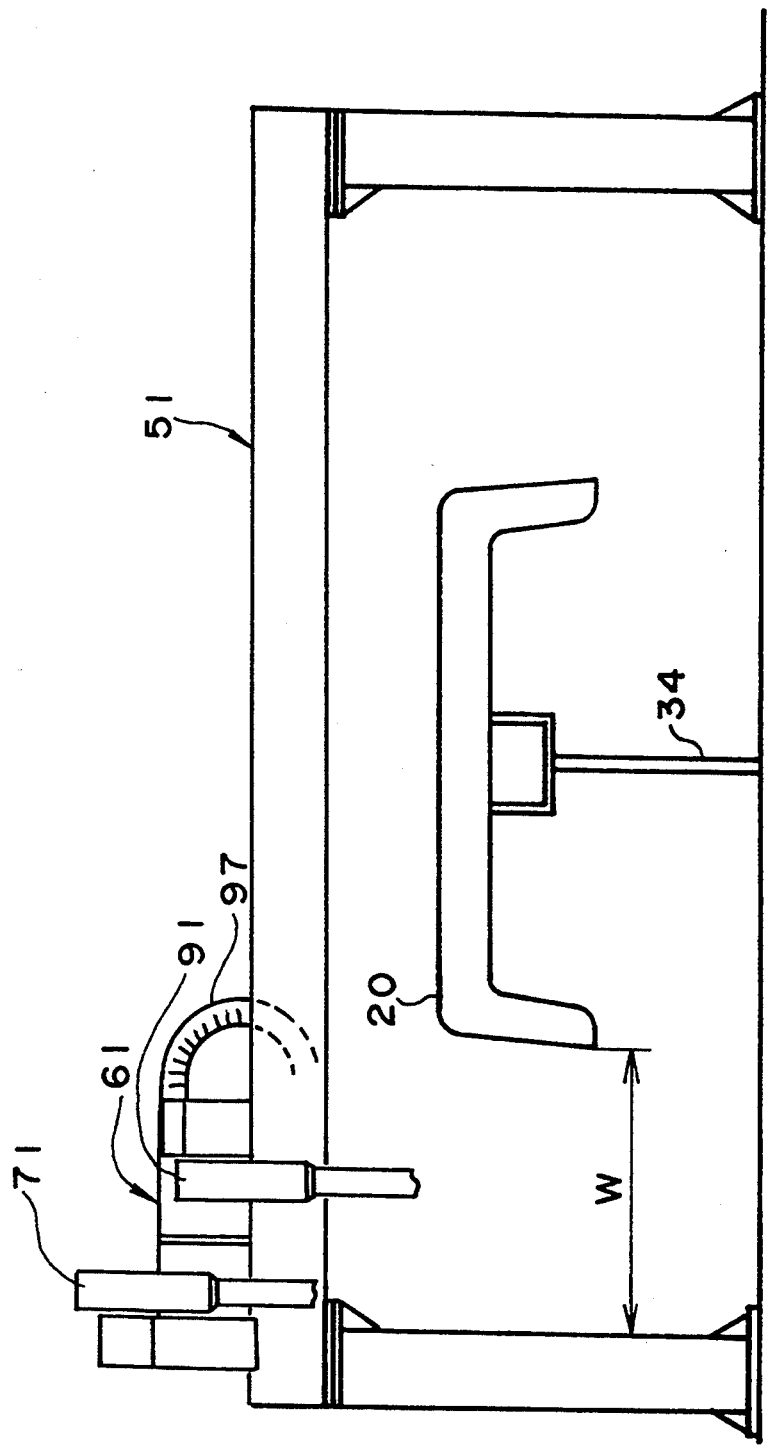
FIG. 9 is a front elevational view of the paint apparatus of FIG. 1 where the robots have changed their attitudes.

Then, the workpiece 20 is conveyed from the first predetermined position to the second predetermined position. When the workpiece 20 is being conveyed to the second predetermined position, the first and second robots 71 and 91 are in a waiting position W between the ends of the workpiece and the posts 53 as shown in FIGS. 7 and 9.

Figure 8:
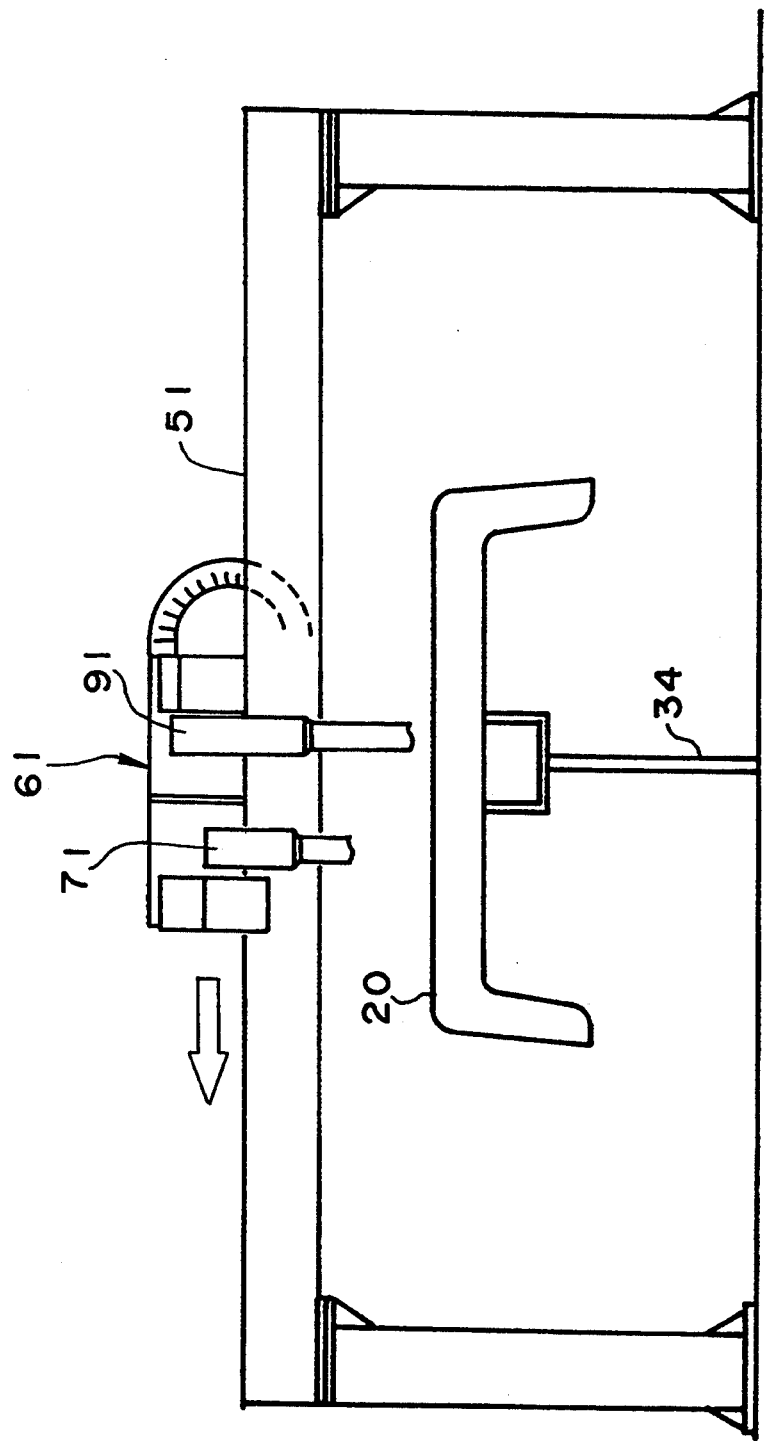
FIG. 8 is a front elevational view of the paint apparatus of FIG. 1 showing the robots in a painting position.

When the workpiece stops at the second predetermined position, the carriage 61 begins to move along the beam 53, and the first and second robots 71 and 91 which move together with the carriage 61 along the workpiece begin to paint the remaining portion of the workpiece as shown in FIG. 8.

Figure 10:
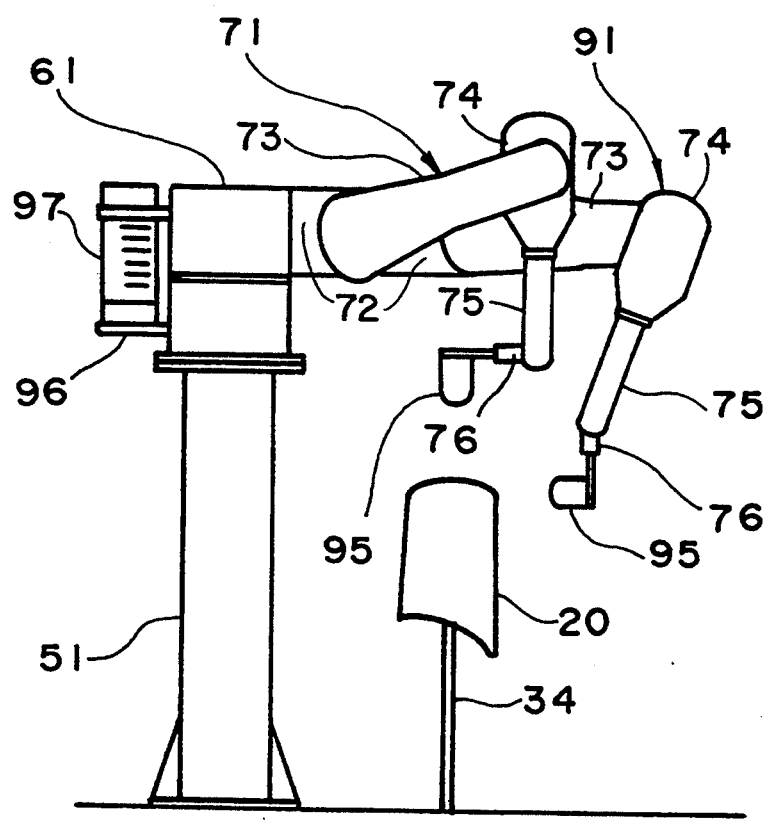
FIG. 10 is a side elevational view of the paint apparatus of FIG. 8.

When the first and second robots 71 and 91 come to the end portion of the beam 53, the reciprocally driven first and second robots 71 and 91 change their positions to paint the remaining unpainted portions of the workpiece. FIG. 10 shows a different painting positions of the first and second robots 71 and 91 for painting various portions of the workpiece. In the preferred embodiment, three reciprocal motions of the first and second robots 71 and 91 are sufficient to complete the painting of each workpiece.

Since the first and second robots 71 and 91 are spaced apart from each other by the predetermined distance B in the first direction and are moved together with the carriage maintaining the distance B, the first and second robots 71 and 91 do not collide with each other. By preventing the first and second robots 71 and 91 from colliding with each other in this manner, programming the robots is made easier.

Furthermore, since the first and second robots 71 and 91 are spaced from each other in the second direction by means of the spacer 90, the first robot 71 and the second robot 91 are easily arranged so as to inject paint onto the workpiece 20 from opposite sides of the workpiece 20. Also, since the first and second robots 71 and 91 are spaced apart from each other in the first direction, the first and second robots 71 and 91 do not inject paint onto each other. As a result, accumulation of paint on the robots and paint falling from the robots onto the workpiece is suppressed.

Furthermore, since the beam 53 of the framework 51 is spaced from the painting position by the distance A in the horizontal direction, the paint collecting on the beam 53 does not fall onto the workpiece 20 to deteriorate the paint quality. After the workpiece is painted at the second painting position, the hook of the chain 33 engages again the carrier 34 to convey the workpiece 20 out of the painting booth 21.

Figure 11:
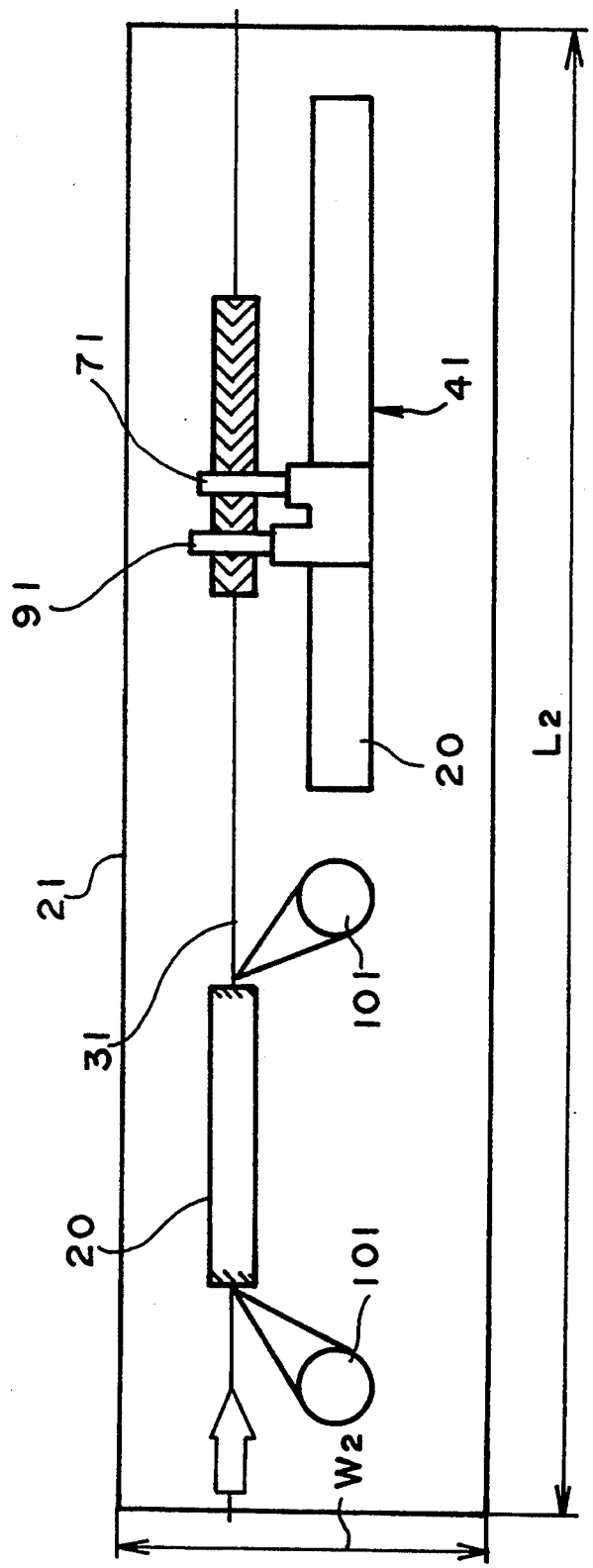
FIG. 11 is a plan view of a painting booth in accordance with a second embodiment of the invention.

FIG. 11 illustrates a painting apparatus in accordance with a second embodiment of the present invention. The second embodiment differs from the first embodiment in the orientation of the paint apparatus in the painting booth 21 and in the direction of a workpiece 20 as it is conveyed through the painting booth 21. More particularly, in the second embodiment of the present invention, the workpiece 20 (for example, an automobile bumper) is conveyed through the painting booth 21 so that the longitudinal direction of the workpiece 20 is directed in the same direction as the longitudinal direction of the painting booth 21. Also, the paint apparatus is oriented in the painting booth 21 such that the longitudinal direction of the paint apparatus (the longitudinal direction of the beam of the framework) is parallel to the longitudinal direction of the painting booth 21. Since the other structures of the paint apparatus of the second embodiment are the same as those of the paint apparatus of the first embodiment, description of the similar structural portions of the second embodiment of the present invention is omitted. The same structural portions are denoted with the same reference numerals as those of the first embodiment of the present invention.

By using the above-described arrangement, the width $W_2$ of the painting booth 21 of the second embodiment of the present invention is decreased as compared with that of the painting booth of the first embodiment of the present invention, though the length $L_2$ of the painting booth 21 of the second embodiment of the invention is increased.

In accordance with the present invention, the following advantages will be obtained:

First, since the first robot 71 and the second robot 91 are mounted to the carriage and spaced from each other in the direction parallel to the beam 53 of the framework 51, collision of the first robot 71 and the second robot 91 is prevented. As a result, programming the first and second robots 71 and 91 is simple and easy.

Second, since the first robot 71 and the second robot 91 are spaced from each other in the second direction perpendicular to the beam 53 of the framework 51, the spray gun supported by the first robot 71 and the spray gun supported by the second robot 91 spray paint onto the workpiece from opposite sides of the workpiece. Because the first and second robots 71 and 91 are spaced from each other in a direction parallel to the beam of the framework, spraying paint onto each other is prevented. As a result, paint falling from the robots onto the workpiece is suppressed, thereby maintaining good paint quality on the workpiece.

Third, since the beam 53 of the framework 51 is spaced in the horizontal direction from the painting position, paint is prevented from falling from the beam 53 onto the workpiece. As a result, the paint quality is improved.

Although only two embodiments of the invention have been described in detail above, it will be appreciated by those skilled in the art that various modifications and alterations can be made to the particular embodiments shown without materially departing from the novel teachings and advantages of the present invention. Accordingly, it is understood that all such modifications and alterations are included within the spirit and scope of the present invention as defined by the following claims.

What is claimed is:

1. A paint apparatus for painting a workpiece at a workpiece painting position comprising:
   (a) a framework including a horizontal beam which lies along a first direction, said beam being horizontally spaced from the workpiece painting position;
   (b) a moveable carriage which is constrained to move along said beam in said first direction;
   (c) a first robot mounted to said carriage at a first mounting location, said first robot including a first painting device and first means for moving said first painting device through a first range of movement; and
   (d) a second robot mounted to said carriage at a second mounting location, said second mounting location being separated from the first mounting location in both said first direction and a second direction perpendicular to and horizontal with said first direction, said second robot including a second painting device and second means for moving said second painting device through a second range of movement, wherein said first and second ranges of movement are limited with respect to said first direction such that said ranges of movement do not overlap.

2. A paint apparatus according to claim 1, wherein each of the moving means of the first robot and the second robot includes:
   a base coupled to the carriage and defining a first axis which extends in the first direction;
   a first arm coupled to the base so as to be rotatable about the first axis and extending perpendicularly to the first axis, the first arm defining a second axis which is parallel to and is spaced from the first axis;
   a second arm coupled to the first arm so as to be rotatable about the second axis and extending perpendicularly to the second axis, the second arm defining a third axis which is perpendicular to the second axis;
   a third arm coupled to the second arm so as to be rotatable about the third axis and extending along the third axis, the third arm defining a fourth axis which is perpendicular to the third axis;
   a wrist member coupled to the third arm so as to be rotatable about the fourth axis and extending perpendicularly to the fourth axis, the wrist member defining a fifth axis which is perpendicular to the fourth axis; and
   a wrist flange coupled to the wrist member so as to be rotatable about the fifth axis and extending along the fifth axis, a spray gun being coupled to the wrist flange.

3. A paint apparatus according to claim 2, wherein each of the moving means of the first and second robots includes:
   a first electric motor for rotating the first arm and a first speed reducer coupled to the first electric motor, the first electric motor and the first speed reducer being housed within the base;
   a second electric motor for rotating the second arm housed in the first arm and a second speed reducer coupled to the second motor, the second electric motor and the second speed reducer being housed within the first arm;
   a third electric motor for rotating the third arm and a third speed reducer coupled to the third electric motor, the third electric motor and the third speed reducer being housed within the second arm;
   a fourth electric motor for rotating the wrist member and a fourth speed reducer coupled to the fourth electric motor, the fourth electric motor and the fourth speed reducer being housed within the second arm; and
   a fifth electric motor for rotating the wrist flange and a fifth speed reducer coupled to the fifth electric motor, the fifth electric motor and the fifth speed reducer being housed within the second arm.

4. A paint apparatus according to claim 2, wherein the first robot and the second robot are spaced from each other in the first direction by a predetermined distance greater than twice a distance defined between the fourth axis and a tip end of the wrist flange.

5. A paint apparatus according to claim 1, wherein the first and second robots have the same structure, the first robot being directly coupled to the carriage, and the second robot being coupled to the carriage via a spacer having a predetermined length so that the second robot is spaced from the first robot by a distance equal to the predetermined length of the spacer in the second direction.

6. A paint apparatus according to claim 1, wherein the beam has a rail, and the carriage has a guide which slidably contacts the rail.

7. A paint apparatus according to claim 1, wherein the beam has a rack, and the carriage has a pinion driven by a geared motor, the pinion engaging the rack.

8. A paint apparatus according to claim 1, further comprising a paint booth, wherein:
   the painting booth has a longitudinal direction; and
   the beam of the framework is installed in the painting booth so as to extend in a direction perpendicular to the longitudinal direction of the painting booth, the workpiece painting position being spaced from the beam of the framework in the longitudinal direction of the painting booth.

9. A paint apparatus according to claim 1, further comprising a paint booth, wherein:
   the painting booth has a longitudinal direction; and
   the beam of the framework is installed in the painting booth so as to extend in the longitudinal direction of the painting booth, the workpiece painting position being spaced from the beam of the framework in a direction perpendicular to the longitudinal direction of the painting booth.

* * * * *